United States Patent
Li et al.

(10) Patent No.: US 8,622,402 B2
(45) Date of Patent: Jan. 7, 2014

(54) AUTOMATIC CONVEYING DEVICE

(75) Inventors: Bing Li, Shenzhen (CN); Shang-Xuan Song, Shenzhen (CN); Yong Xie, Shenzhen (CN)

(73) Assignees: Hong Fu Jin Precision Industry (ShenZhen) Co., Ltd, Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 74 days.

(21) Appl. No.: 13/437,133

(22) Filed: Apr. 2, 2012

(65) Prior Publication Data

US 2013/0081884 A1    Apr. 4, 2013

(30) Foreign Application Priority Data

Sep. 30, 2011    (CN) .......................... 2011 1 0291779

(51) Int. Cl.
*F03G 3/00*    (2006.01)

(52) U.S. Cl.
CPC ........................................ *F03G 3/00* (2013.01)
USPC ....................................................... 280/1.12

(58) Field of Classification Search
CPC ................ F03G 3/00; F03G 3/02; F03G 3/04
USPC ............ 180/2.2, 7.1; 446/288, 471, 465, 457; 53/270, 252, 393; 290/1 R; 280/254, 280/1.12, 252
See application file for complete search history.

(56) References Cited

U.S. PATENT DOCUMENTS

| | | | | |
|---|---|---|---|---|
| 1,452,835 A | * | 4/1923 | Goldman | 446/174 |
| 1,478,350 A | * | 12/1923 | Okel | 446/173 |
| 1,631,016 A | * | 5/1927 | Craven | 446/173 |
| 1,867,687 A | * | 7/1932 | Van Etten | 74/130 |
| 3,164,391 A | * | 1/1965 | O'Neal | 280/1.12 |
| 6,079,724 A | * | 6/2000 | Lin | 280/221 |
| 6,325,400 B1 | * | 12/2001 | Lai | 280/253 |
| 2010/0078903 A1 | * | 4/2010 | Bravo | 280/33.992 |

* cited by examiner

*Primary Examiner* — J. Allen Shriver, II
*Assistant Examiner* — Brian Cassidy
(74) *Attorney, Agent, or Firm* — Altis Law Group, Inc.

(57) ABSTRACT

An automatic conveying device includes a conveyer bracket, a wheel assembly, a transmission mechanism, and a loading assembly. The wheel assembly is rotatably assembled to a bottom portion of the conveyer bracket for supporting the conveyer bracket. The transmission mechanism is assembled within the conveyer bracket and connected with the wheel assembly, thereby driving the wheel assembly to rotate. The loading assembly is mounted upon the conveyer bracket and movably assembled with the transmission mechanism, for accepting objects as a load and driving the transmission mechanism to work. The loading assembly moves downward relative to the conveyer bracket under the weight of the objects placed on the loading assembly, and is capable of moving upward back to its original position, when the objects are removed.

10 Claims, 6 Drawing Sheets

AUTOMATIC CONVEYING DEVICE

BACKGROUND

1. Technical Field

The present disclosure generally relates to conveying devices, and particularly to an automatic conveying device for conveying objects automatically.

2. Description of Related Art

Conveying devices convey objects between two preset workstations. A conveying device can be slidably mounted on a preset one-way inclined tramway that is disposed between the two preset workstations. The one-way inclined tramway includes a top end positioned at a high level, and a bottom end positioned at a lower level. In use, the conveying device slides from the top end toward the bottom end automatically, and after the objects are taken away, the empty conveyer is slid back to the top end manually. Such a conveying device has a low transfer efficiency. In addition, because the tramway is inclined, gravity increases the force of the impacts and shocks on the tramway by the conveying device.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views, and all the views are schematic.

DETAILED DESCRIPTION

Figure 1:
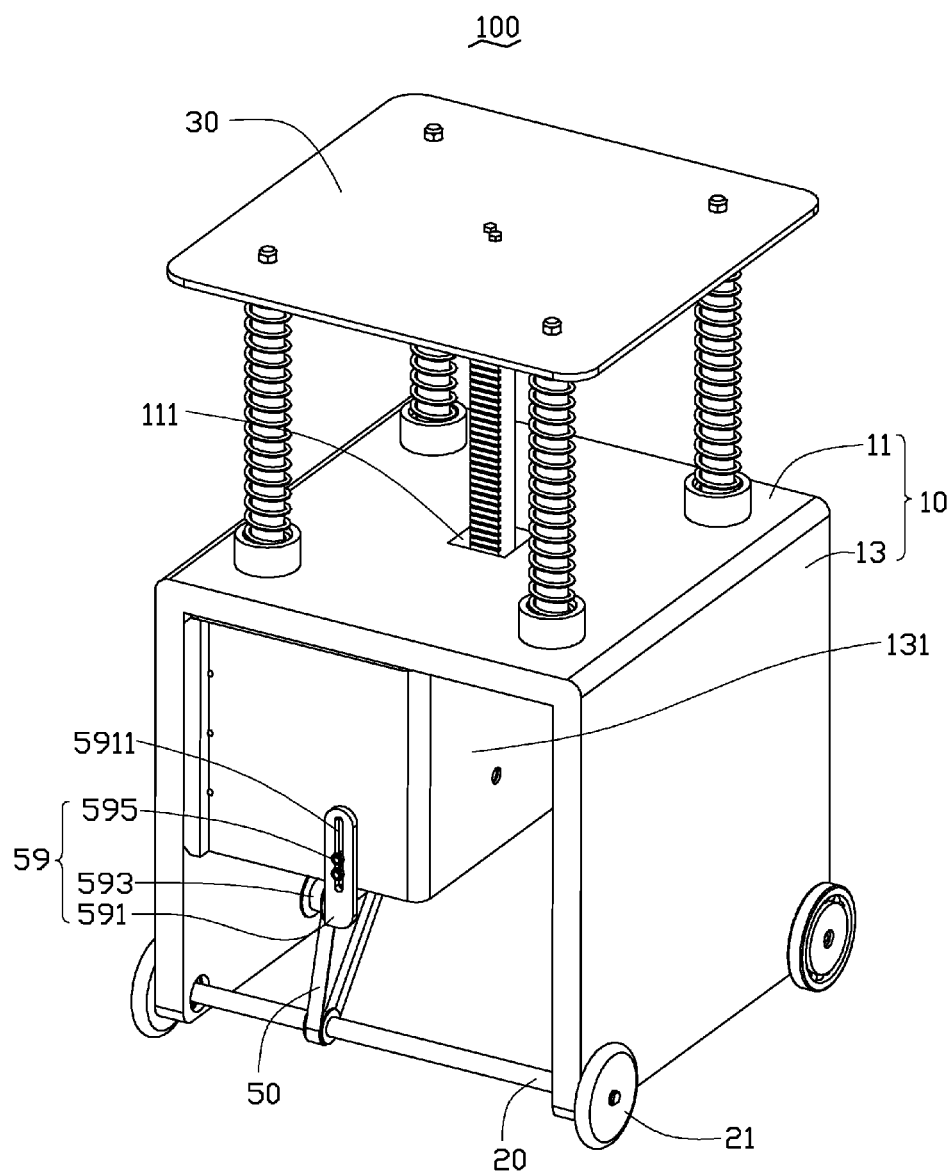
FIG. 1 shows an isometric view of an embodiment of an automatic conveying device.
Figure 2:
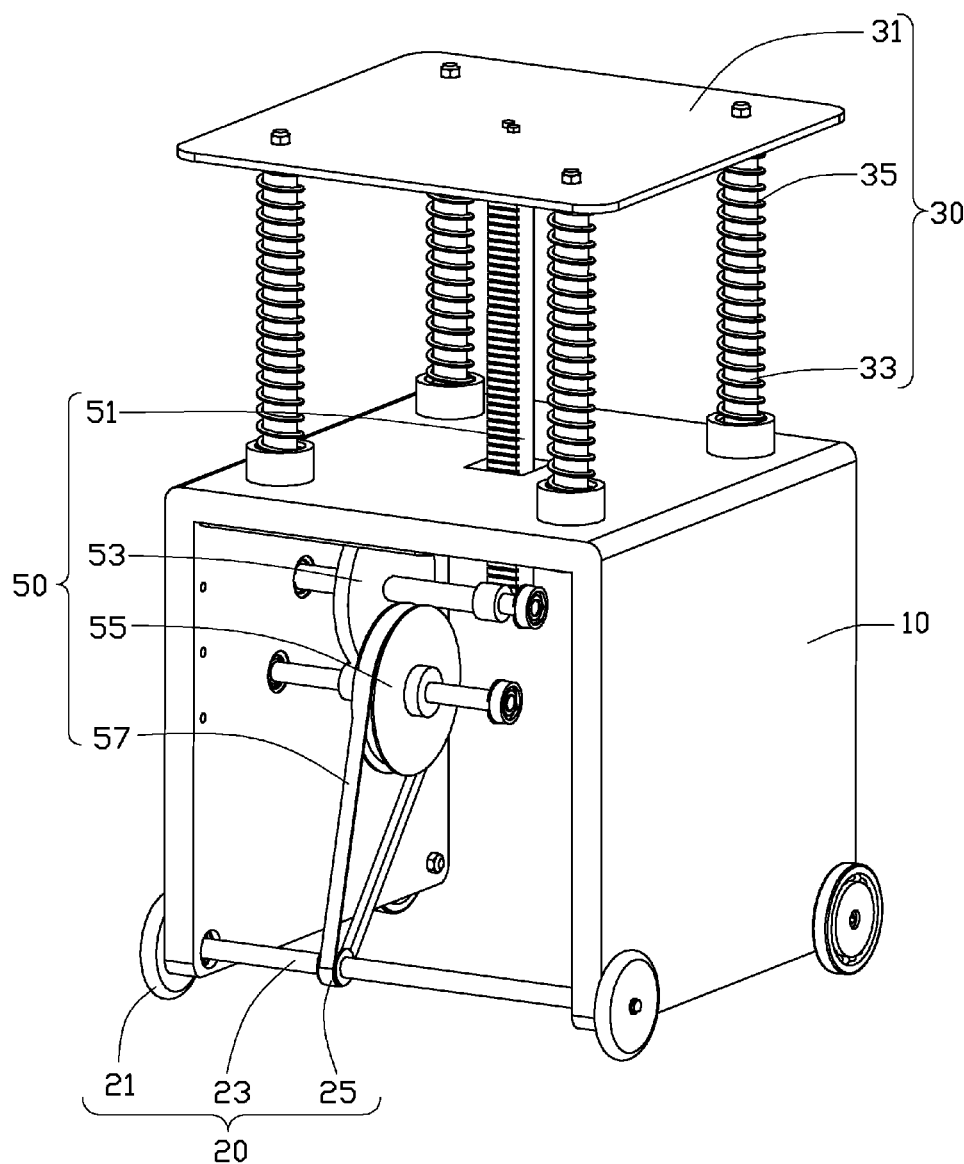
FIG. 2 shows a partially assembled isometric view of the automatic conveying device of FIG. 1.

Referring to FIGS. 1 and 2, an embodiment of an automatic conveying device 100 is shown. The automatic conveying device 100 includes a conveyer bracket 10, a wheel assembly 20, a loading assembly 30, and a transmission mechanism 50. The wheel assembly 20 is rotatably assembled to a bottom portion of the conveyer bracket 10. The transmission mechanism 50 is assembled within the conveyer bracket 10 and connected with the wheel assembly 20, thereby driving the wheel assembly 20 to rotate and enabling the automatic conveying device 100 to travel. The loading assembly 30 is movably mounted to the transmission mechanism 50 and positioned upon the conveyer bracket 10, for loading the objects and driving the transmission mechanism 50 to work. The loading assembly 30 is capable of moving downwards relative to the conveyer bracket 10 under a gravity force from the objects placed on the loading assembly 30, and is capable of moving upward back to its original position when the objects are removed from the loading assembly 30.

The conveyer bracket 10 can be a substantially U-shaped body, inverted, and includes a top wall 11 and two substantially parallel side walls 13 connecting with opposite ends of the top wall 11. The top wall 11 defines a mounting hole 111 through a central portion of the top wall 11, and further defines at least one guiding hole 115. In the illustrated embodiment, there are four guiding holes 115 defined through the top wall 11 and each one is positioned adjacent to a corner of the top wall 11. A box-section cover 131 is fixed to one side wall 13 of the conveyer bracket 10, and received within the conveyer bracket 10. The cover 131 and the side wall 13 cooperatively define a receiving chamber (not labeled) for receiving the transmission mechanism 50.

The wheel assembly 20 includes four wheels 21, a drive shaft 23, and a drive wheel 25. The four wheels 21 are rotatably assembled adjacent to four corners of the bottom portion of the conveyer bracket 10. In the illustrated embodiment, a first pair of wheels 21 are oppositely assembled to two sides of one end of the bottom portion of the conveyer bracket 10. A second pair of wheels 21 are rotatably assembled to opposite sides of the other end of the bottom portion of the conveyer bracket 10. The first pair of wheels 21 or the second pair of wheels 21 are connected to the drive shaft 23. The drive wheel 25 is coaxially sleeved on a middle portion of the drive shaft 23, and received within the conveyer bracket 10. In another embodiment, the drive wheel 25 is integrally formed with the drive shaft 23.

Figure 3:
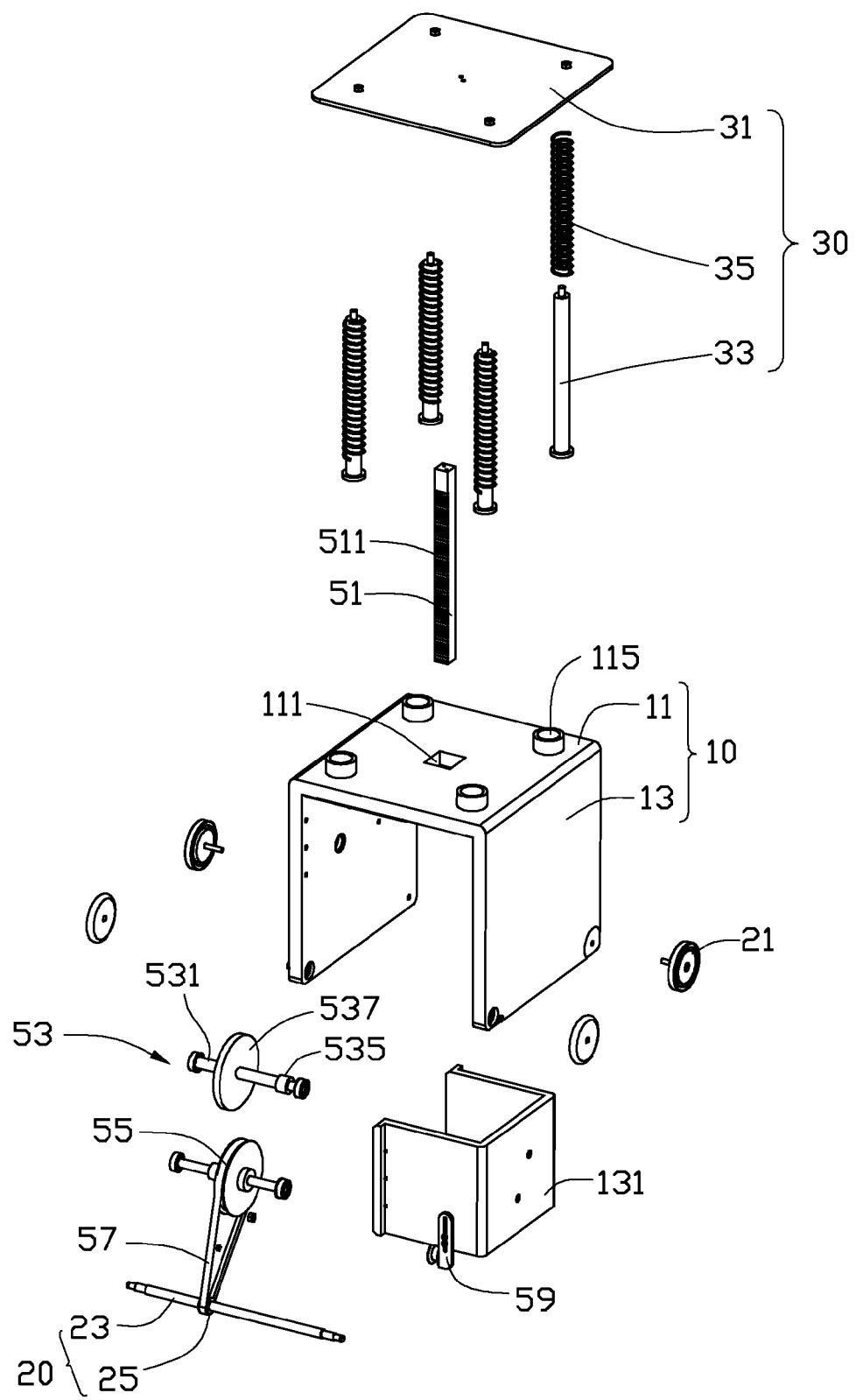
FIG. 3 shows an exploded isometric view of the automatic conveying device of FIG. 1.
Figure 4:
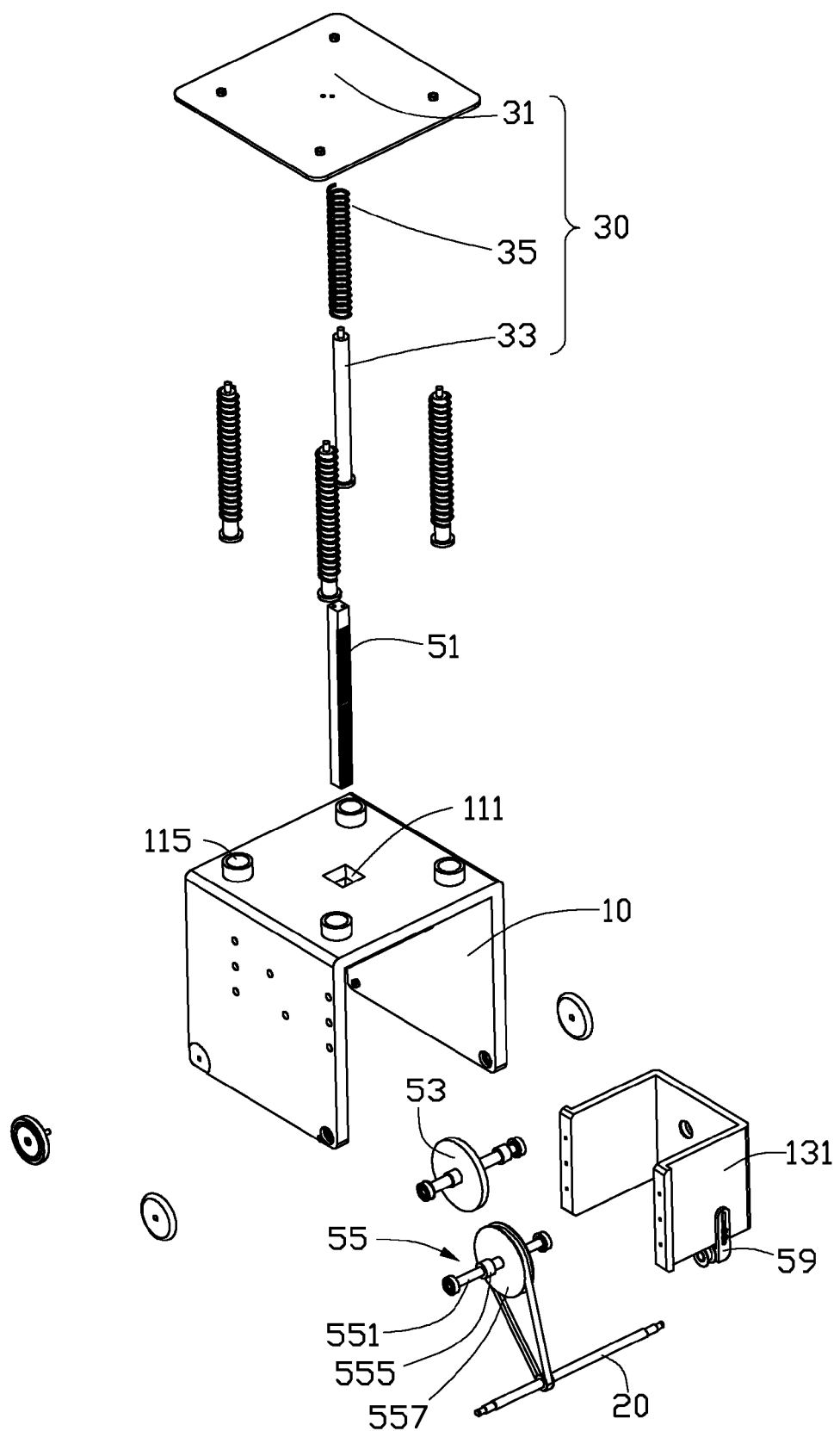
FIG. 4 is similar to FIG. 3, but viewed from another aspect.

Also referring to FIGS. 3 and 4, the loading assembly 30 includes a loading plate 31, at least one guiding post 33, and at least one elastic member 35. The loading plate 31 is substantially rectangular, and is slidably mounted to the conveyer bracket 10 via the at least one guiding post 33 and the at least one elastic member 35. One end of the guiding post 33 is fixed to the loading plate 31, and the other end of the guiding post 33 slidably passes through a guiding hole 115 of the top plate 11 and is received within the conveyer bracket 10. The elastic member 35 is a coil spring sleeved on the guiding post 33, sandwiched between the loading plate 31 and the top wall 11 of the conveyer bracket 10. In the illustrated embodiment, there are four guiding posts 33 and four elastic members 35.

The transmission mechanism 50 includes a rack 51, a first transmission assembly 53, a second transmission assembly 55, a transmission belt 57 and a tension assembly 59. The rack 51 is substantially perpendicular to the top wall 11 of the conveyer bracket 10. One end of the rack 51 is fixed to the loading plate 31, and the other end of the rack 51 passes through the mounting hole 111 and enters into the conveyer bracket 10.

The first transmission assembly 53 is assembled within the conveyer bracket 10 and rotatably engages with the rack 51. The first transmission assembly 53 includes a rotary shaft 531, a first transmission gear 535, and a second transmission gear 537. One end of the rotary shaft 531 is rotatably assembled to the side wall 13 of the conveyer bracket 10 and is positioned substantially parallel to the drive shaft 23. The other end of the rotary shaft 531 is rotatably assembled to the cover 131. The first transmission gear 535 and the second transmission gear 537 are both sleeved on the rotary shaft 531, and positioned adjacent to each other. The first transmission gear 535 rotatably engages with the rack 51. The second transmission gear 537 has a diameter greater than that of the first transmission gear 535.

The second transmission assembly 55 is rotatably assembled within the conveyer bracket 10 and engages with the first transmission assembly 53. The second transmission assembly 55 includes a transmission shaft 551, an engaging gear 555, and a belt wheel 557. The transmission shaft 551 is rotatably assembled within the conveyer bracket 10 and is substantially parallel with and positioned between both the rotary shaft 531 and the drive shaft 23. The engaging gear 555 and the belt wheel 557 are both sleeved on the transmission shaft 551, and are adjacent to each other. The engaging gear 555 rotatably engages with the corresponding second transmission gear 537. The belt wheel 557 has a diameter greater than that of the engaging gear 555.

The transmission belt 57 is sleeved on the belt wheel 557 and the drive wheel 25, thereby driving the drive shaft 23 to rotate together with the transmission shaft 551.

The tension assembly 59 is assembled within the conveyer bracket 10 and positioned beside the second transmission assembly 55 to resist against the transmission belt 57, thereby adjusting the tension in the transmission belt 57. The tension assembly 59 includes an adjusting plate 591, a tension wheel 593, and an adjusting body 595. The adjusting plate 591 is substantially L-shaped and defines an adjusting slot 5911. The adjusting plate 591 is adjustably mounted to the cover 131 via the adjusting body 595. The tension wheel 593 is assembled to one end of the adjusting plate 591 and presses against the transmission belt 57.

Figure 5:
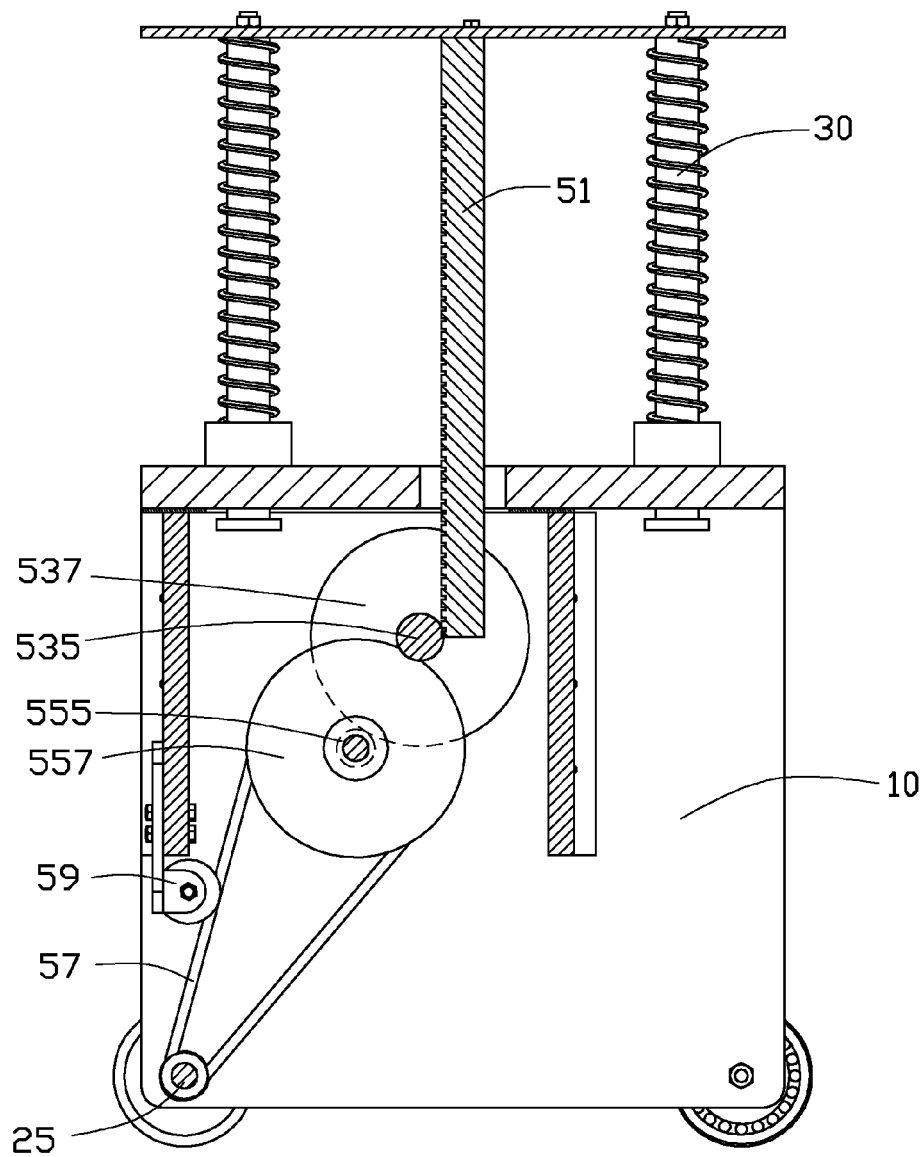
FIG. 5 shows a cut-away view of the automatic conveying device of FIG. 1, wherein the automatic conveying device is in its original state.
Figure 6:
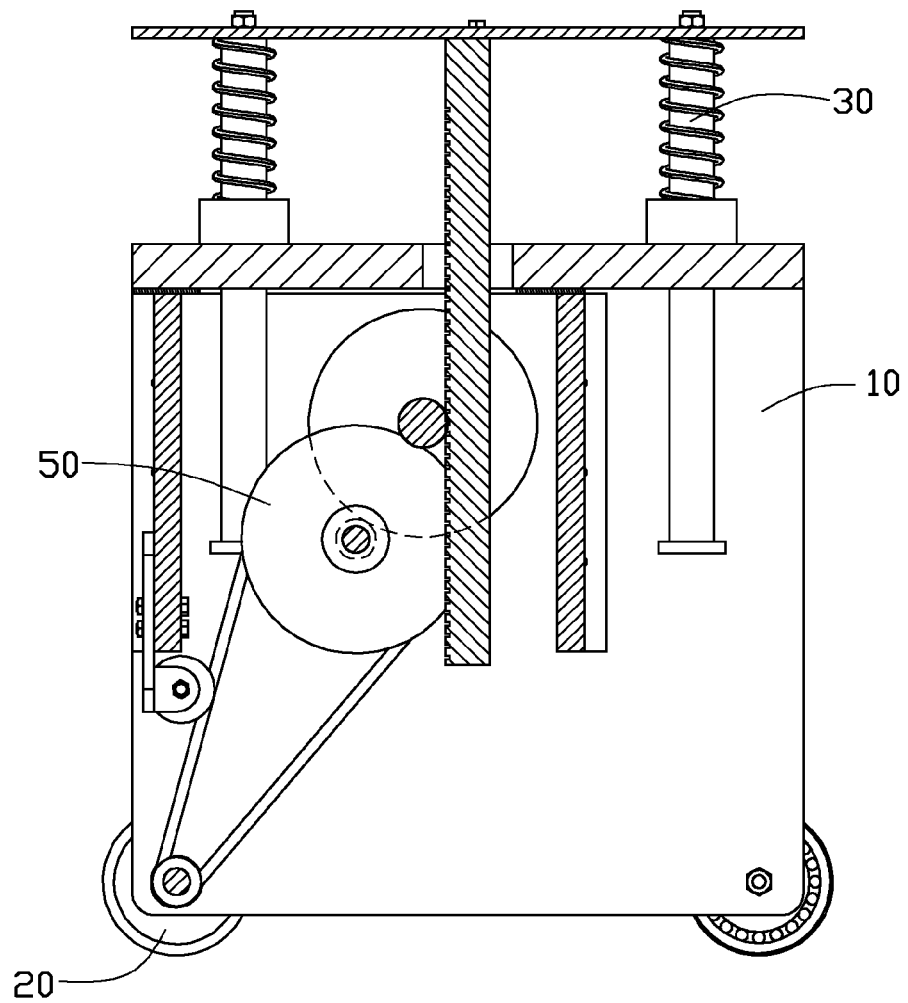
FIG. 6 is similar to FIG. 5, but shows a working state of the automatic conveying device.

Also referring to FIGS. 5 and 6, when assembling the automatic conveying device 100, the wheel assembly 20 is first rotatably assembled to a bottom portion of the conveyer bracket 10 for supporting the conveyer bracket 10. The loading plate 31 is assembled upon the top wall 11 of the conveyer bracket 10 via the four guiding posts 33 and the four elastic members 35. One end of the rack 51 is fixed to the loading plate 31, and the other end of the rack 51 passes through the mounting hole 111 and enters into the conveyer bracket 10. The first transmission assembly 53 is assembled within the conveyer bracket 10 with the first transmission gear 535 rotatably engaging with the rack 51. The second transmission assembly 55 is then rotatably assembled within the conveyer bracket 10 and positioned substantially parallel to the first transmission assembly 53. The engaging gear 555 of the second transmission assembly 55 rotatably engages with the second transmission gear 537 of the first transmission assembly 53. The transmission belt 57 is sleeved on the belt wheel 557 and the drive wheel 25 to connect the second transmission assembly 55 and the wheel assembly 20. The cover 131 is assembled into the conveyer bracket 10 and fixed to one side wall 13 to cover the transmission mechanism 50. The tension assembly 59 is finally assembled within the conveyer bracket 10 and positioned beside the second transmission assembly 55 to press against the transmission belt 57.

In use, objects are put on the loading plate 31 and the gravity of the objects forces the rack 51 together with the loading plate 31 to slide downward relative to the top wall 11 of the conveyer bracket 10. The elastic members 35 are compressed. The first transmission assembly is driven to rotate via the engagement of the first transmission gear 535 and the rack 51. The second transmission assembly 55 is simultaneously driven to rotate relative to the first transmission assembly 53, and further drives the wheel assembly 20 to rotate via the transmission belt 57. Thus, the whole conveying device 100 is capable of being driven to move along a preset path. When the objects are taken off the loading plate 31, the elastic members 35 push the loading plate 31 upward, until the elastic members 35 return to their original uncompressed positions. The conveying device 100 is then driven to move back to its original position.

In one embodiment, the first transmission assembly 53 can be omitted, such that the engaging gear 555 of the second transmission assembly 55 directly engages with the rack 51.

In another embodiment, the cover 131 and the first transmission assembly 53 can be omitted, such that the rotary shaft 531 and the transmission shaft 555 are rotatably assembled to the two side walls 13 of the conveyer bracket 10.

In another embodiment, the transmission belt 57 can be omitted, so that the first transmission assembly 53 or the second transmission 57 is disposed to directly engage with the drive wheel 25 of the wheel assembly 20.

While various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. An automatic conveying device for conveying objects, comprising:

a conveyer bracket comprising a bottom portion;

a wheel assembly rotatably assembled to the bottom portion of the conveyer bracket to support the conveyer bracket;

transmission mechanism assembled within the conveyer bracket and connected with the wheel assembly, thereby driving the wheel assembly to rotate; and a loading assembly mounted upon the conveyer bracket and movably assembled with the transmission mechanism, for accepting objects as a load and driving the transmission mechanism to work;

wherein the loading assembly is capable of moving downward relative to the conveyer bracket under a weight of the objects placed on the loading assembly, and is capable of moving upward back to its original position when the objects are removed;

wherein the conveyer bracket further comprises a top wall defining a mounting hole, the loading assembly comprises a loading plate and at least one elastic member elastically sandwiched between the loading plate and the top wall, such that the loading plate is elastically mounted upon the top wall; the transmission mechanism comprises a rack and a first transmission assembly, one end of the rack is fixed to the loading plate, and an opposite other end of the rack passes through the mounting hole and enters into the conveyer bracket; the first transmission assembly is assembled within the conveyer bracket and rotatably engages with the rack and the wheel assembly;

wherein the first transmission assembly comprises a rotary shaft rotatably assembled within the conveyer bracket, a first transmission gear, and a second transmission gear, the first transmission gear and the second transmission gear are separately sleeved on the rotary shaft, the first transmission gear rotatably engages with the rack, and the second transmission gear engages with the wheel assembly; and wherein the transmission mechanism further comprises a second transmission assembly rotatably assembled within the conveyer bracket thereby connecting the first transmission assembly and the wheel assembly together; wherein the wheel assembly comprises a first pair of wheels, a second pair of wheels, a drive shaft, and a drive wheel coaxially sleeved on the drive shaft; the first pair of wheels are oppositely assembled to one end of the bottom portion of the conveyer bracket via the drive shaft, the second pair of wheels are rotatably assembled to another end of the bottom portion; the second transmission assembly comprises a transmission shaft, an engaging gear, and a belt wheel, the transmission shaft is rotatably assembled within the conveyer bracket and is substantially parallel and positioned between the rotary shaft and the drive shaft, the engaging gear and the belt wheel are separately sleeved on the transmission shaft, the engaging gear rotatably engages with the second transmission gear, and the transmission belt is sleeved on the belt wheel and the drive wheel.

2. The automatic conveying device of claim 1, wherein a diameter of the second transmission gear is greater than the diameter of the first transmission gear.

3. The automatic conveying device of claim 1, wherein the second transmission assembly further comprises a tension assembly assembled within the conveyer bracket and positioned at a side of the second transmission assembly to resist against the transmission belt, thereby adjusting a tensile force of the transmission belt.

4. The automatic conveying device of claim 3, wherein the tension assembly comprises an adjusting plate, a tension wheel, and an adjusting body, the adjusting plate is adjustably mounted to the cover via the adjusting body, and the tension wheel is assembled to the adjusting plate and resists against the transmission belt.

5. The automatic conveying device of claim 1, wherein the drive wheel is integrally formed with the drive shaft.

6. An automatic conveying, device for conveying objects, comprising:

a conveyer bracket comprising a top wall defining a mounting hole and a bottom portion;

a wheel assembly rotatably assembled to the bottom portion of the conveyer bracket to support the conveyer bracket, the wheel assembly comprising a first pair of wheels, a second pair of wheels, a drive shaft, and a drive wheel coaxially sleeved on the drive shaft, the first pair of wheels being oppositely assembled to one end of the bottom portion of the conveyer bracket via the drive shaft, and the second pair of wheels being rotatably assembled to another end of the bottom portion;

a loading assembly retractably mounted upon the top wall of the conveyer bracket; and a transmission mechanism assembled within the conveyer bracket and comprising a rack and a first transmission assembly; wherein one end of the rack is fixed to the loading assembly, an opposite other end of the rack passes through the mounting hole and enters into the conveyer bracket; the first transmission assembly is assembled within the conveyer bracket and rotatably engages with the other end of the rack and the drive wheel of the wheel assembly; the loading assembly is capable of sliding downward relative to the conveyer bracket under a weight of the objects placed on the loading assembly, and is capable of moving upward back to its original position when the objects are removed;

wherein the first transmission assembly comprises a rotary shaft rotatably assembled within the conveyer bracket, a first transmission gear, a second transmission gear, and a transmission belt, the first transmission gear and the second transmission gear are separately sleeved on the rotary shaft, the first transmission gear rotatably engages with the rack, and the transmission belt is sleeved on the second transmission gear and the drive wheel thereby connecting the second transmission gear and the drive wheel together; and wherein the transmission mechanism further comprises a second transmission assembly rotatably assembled within the conveyer bracket thereby connecting the first transmission assembly and the wheel assembly together; the second transmission assembly comprises a transmission shaft, an engaging gear, and a belt wheel, the transmission shaft is rotatably assembled within the conveyer bracket and is substantially parallel and positioned between the rotary shaft and the drive shaft, the engaging gear and the belt wheel are separately sleeved on the transmission shaft, the engaging gear rotatably engages with the second transmission gear, the transmission belt is sleeved on the belt wheel and the drive wheel.

7. The automatic conveying device of claim 6, wherein the top wall of the conveyer bracket further defines at least one guiding hole, the loading assembly comprises a loading plate, at least one guiding post fixed with the loading plate, and at least one elastic member; the at least one guiding post is movably assembled to the conveyer bracket by passing through the at least one guiding hole, and the elastic member is sleeved on the guiding post and elastically sandwiched between the loading plate and the top wall.

8. The automatic conveying device of claim 6, wherein a diameter of the second transmission gear is greater than a diameter of the first transmission gear.

9. The automatic conveying device of claim 6, wherein the second transmission assembly further comprises a tension assembly assembled within the conveyer bracket and positioned at a side of the second transmission assembly to resist against the transmission belt, thereby adjusting a tensile force of the transmission belt.

10. The automatic conveying device of claim 9, wherein the tension assembly comprises an adjusting plate, a tension wheel, and an adjusting body, the adjusting plate is adjustably mounted to the cover via the adjusting body, and the tension wheel is assembled to the adjusting plate and resists against the transmission belt.

* * * * *